Aug. 22, 1967 TAKUYA HATA ETAL 3,337,350
ELECTROLESS SILVER PLATING
Filed Jan. 2, 1964
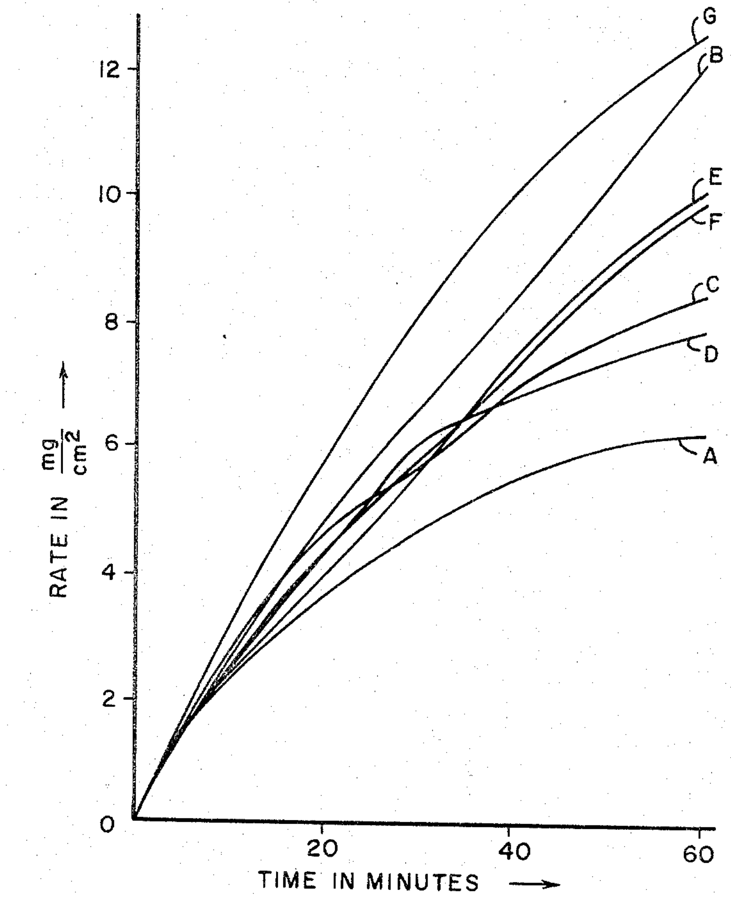
WITNESSES:
Bernard R. Gieguez
James F. Young
INVENTORS
Takuya Hata and
Takeaki Hanada
BY Alex Mich Jr.
ATTORNEY United States Patent Office 3,337,350

Patented Aug. 22, 1967

3,337,350

ELECTROLESS SILVER PLATING

Takuya Hata and Takeaki Hanada, Hyogo-ken, Japan, assignors to Mitsubishi Denki Kabushiki Kaisha, Tokyo, Japan, a company of Japan Filed Jan. 2, 1964, Ser. No. 335,304
Claims priority, application Japan, Jan. 11, 1963, 38/1,156
11 Claims. (Cl. 106—1)

This invention relates, generally, to electroless plating and, more specifically, to electroless silver plating.

In general, electroless or immersion plating may, on the basis of mechanism, be classified in one of two categories, either the replacement type or the reduction type. Examples of the reduction type include the electroless or immersion plating of nickel, copper and the like where the effective mechanism is the chemical reduction of metallic ions. An example of the replacement type is the electroless or immersion plating of silver where the effective mechanism is the substitution reaction between ions of the plating metal, for example silver, and the base or foundation metal to be plated.

In the replacement type of electroless plating generally, the base or foundation metal is dissolved as the plating operation proceeds. As the process proceeds, a barely soluble or insoluble compound or compounds may either coat or precipitate on the plated surface, the quality of the deposited plate will be deteriorated and the useful life of the plating solution will be reduced.

In an attempt to overcome these and other difficulties, complexing agents have been added to the bath to produce highly soluble complex salts instead of the barely soluble or insoluble compound or compounds. Buffering agents have been added to maintain a pH value or range suitable for improved adhesion between the base metal and the plated coating. While such measures of the prior art may have some merit, the measures scarcely increased the plating speed and the maximum possible plating thickness. As the plating metal is deposited on the surface of the base metal, the driving force of the reaction is reduced. At certain thicknesses, the entire surface of the base metal will be homogeneously covered with the plating metal, the driving force will be nil and the plating phenomena will be terminated. It will be apparent that the maximum silver plate thickness and plating speed is thus limited.

Accordingly, it is a general object of this invention to increase the plating speed of silver in electroless techniques.

Another object of this invention is to increase the maximum thickness of silver which may be deposited by electroless techniques.

Further objects and advantages of this invention will become apparent as the following description proceeds and features of novelty which characterize the invention will be pointed out in particularity in the claims annexed to and forming a part of this specification.

For a better understanding of the invention, reference may be had to the accompanying drawing, in which the single figure is a series of curves which illustrate the plating speeds of various electrolytes.

In accordance with the foregoing objects, it has now been discovered that the addition of certain soluble metal salts to electroless silver plating baths will increase the plating sped and the maximum possible plate thickness. The addition of at least one soluble salt of a metal selected from the group consisting of copper, nickel, cobalt, zinc and gold to an aqueous electroless silver bath will increase the maximum thickness and increase the speed at which particular thicknesses may be deposited.

The following examples are presented in order to specifically illustrate the invention.

An aqueous bath containing 10 gms./liter of silver cyanide, 50 gms./liter of sodium cyanide, 40 gms./liter of sodium citrate and 3 gms./liter of gold-potassium cyanide is prepared. A nickel member is immersed in the solution and the weight of silver deposited per unit area for various times is measured over a one hour period. Other baths are prepared, identical to the foregoing except that other metal salts are substituted for the gold salts. Similar measurements of deposited silver are made using these baths. For comparative purposes, the deposit from an aqueous bath containing 10 gms./liter of silver cyanide and 25 gms./liter of sodium cyanide was also measured over a one hour period. All plating baths are maintained at a temperature of 80° C. A thicker deposit of silver is apparent in the examples containing one or more of the added metal salts, in accordance with the invention. A summary of the results is presented in Table I. From Table I, it is apparent that the metal salts may be present in the range of about 3 to 5 grams per liter.

TABLE I

| Agent (Unit) | A | B | C | D | E | F | G |
|---|---|---|---|---|---|---|---|
| Silver cyanide (g./l.) | 10 | 10 | 10 | 10 | 10 | 10 | 10 |
| Sodium cyanide (g./l.) | 25 | 50 | 50 | 50 | 50 | 50 | 50 |
| Sodium citrate (g./l.) | ---- | 40 | 40 | 40 | 40 | 40 | 40 |
| Gold-potassium cyanide (g./l.) | ---- | 3 | ---- | ---- | ---- | ---- | 2 |
| Copper-potassium cyanide (g./l.) | ---- | ---- | 3 | ---- | ---- | ---- | 1 |
| Nickel-potassium cyanide (g./l.) | ---- | ---- | ---- | 5 | ---- | ---- | ---- |
| Cobalt-potassium cyanide (g./l.) | ---- | ---- | ---- | ---- | 5 | ---- | ---- |
| Zinc oxide (g./l.) | ---- | ---- | ---- | ---- | ---- | 5 | ---- |
| Plating Speed (mg./cm.²/h.) | 6 | 12 | 8.5 | 8 | 10 | 10 | 12.4 |

Referring now to the single figure of the drawing, there is illustrated a comparison of the prior art electroless silver plating with those of this invention in terms of silver plate weight and plating time. The letters identifying the plotted curves also identify the composition employed in accordance with the examples in Table I.

It is clear from the curves that the plating from the prior art composition is essentially terminated after an interval of 30 or 40 minutes. Plating from the compositions and processes of this invention continue at significant speeds even after 60 minutes. A thick layer of silver can be rapidly produced in accordance with this invention. Moreover, the plated coatings of this invention have an improved appearance and adhesion over those of the prior art.

Although we do not wish to be limited by any theory, it is theorized that a very small amount of the added metal agent is either precipitated or associated with the surface of the base metal to form a large number of local cells, each cell exhibiting a high driving force, thus greatly increasing the plating speed. It is believed that the driving force is substantially maintained at a constant rate even after a substantial thickness of silver is deposited as the added metal agent is constantly precipitated on or associated with the surface.

Spectroscopic examination of the silver deposits of this invention indicate that the added metal agent is present, as an impurity, only in the order of 0.001 percent, by weight, even though it is theorized that numerous local cells are formed on the surface being plated by a precipitation of the added agents.

As little as about 0.001 mole of the active metal additives per liter of plating solution or electrolyte will produce measurable improvements in plating speeds and/or plating thicknesses. Other base or foundation metals suitable for use in this invention are those which are above silver in the electromotive force series, as for example copper and cobalt.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

We claim as our invention:

1. In an aqueous silver cyanide electrolyte for the electroless deposition of silver, the improvement comprising providing a small amount of a cyanide of an active metal in said electrolyte to improve the silver plating speed, the active metal being selected from the group consisting of copper, nickel, cobalt, zinc and gold.

2. The electrolyte of claim 1 wherein the concentration of the cyanide of an active metal is at least about 0.001 mole per liter of electrolyte.

3. The electrolyte of claim 2 wherein the active metal is nickel.

4. The electrolyte of claim 2 wherein the active metal is cobalt.

5. The electrolyte of claim 2 wherein the active metal is zinc.

6. In the method of electroless deposition of silver on a member of a metal above silver in the electromotive force series wherein said member is contacted with an aqueous silver cyanide electrolyte, the improvement comprising providing a small amount of a cyanide of an active metal in said electrolyte to improve the silver plating speed, the active metal being selected from the group consisting of copper, nickel, cobalt, zinc and gold.

7. The method of claim 6 wherein the concentration of the cyanide of an active metal is at least about 0.001 mole per liter of electrolyte.

8. The method of claim 6 wherein the concentration of the cyanide of an active metal is from about 3 to 5 grams per liter of electrolyte.

9. The method of claim 6 wherein the active metal is nickel.

10. The method of claim 6 wherein the active metal is cobalt.

11. The method of claim 6 wherein the active metal is zinc.

References Cited

UNITED STATES PATENTS

| | | | |
|---|---|---|---|
| 670,156 | 3/1901 | Laval | 106—1 |
| 1,208,507 | 12/1916 | Dalby | 106—1 |
| 3,130,072 | 4/1964 | Duva et al. | 106—1 |

D. J. ARNOLD, *Primary Examiner.*

ALEXANDER H. BRODMERKEL, *Examiner.*

L. B. HAYES, *Assistant Examiner.*